United States Patent [19]

Collie

[11] Patent Number: 5,077,510
[45] Date of Patent: Dec. 31, 1991

[54] FOUR SIDED SCALING ROBOT

[75] Inventor: Arthur A. Collie, Hayling Island, England

[73] Assignees: Portsmouth Technology Consultants Limited; Portsmouth Polytechnic Enteroprises Limited, both of Hampshire, England

[21] Appl. No.: 604,511

[22] Filed: Oct. 29, 1990

[30] Foreign Application Priority Data

Oct. 31, 1989 [GB] United Kingdom ............... 8924500

[51] Int. Cl.$^5$ .................. B25J 9/14; B62D 57/24
[52] U.S. Cl. .................. 318/568.12; 318/568.16; 318/568.2; 901/15; 901/22
[58] Field of Search ......... 318/568.2, 568.13, 568.16, 318/568.25, 568.12; 901/27-28, 9, 15, 19, 22, 48

[56] References Cited

U.S. PATENT DOCUMENTS 4,300,198 11/1981 Davini .............................. 901/28
4,408,286 10/1983 Kikuchi et al. .................... 901/27
4,442,387 4/1984 Lindbom ......................... 318/568.2

FOREIGN PATENT DOCUMENTS 0389243 9/1990 European Pat. Off. .
2230357 10/1990 United Kingdom .

Primary Examiner—William M. Shoop, Jr.
Assistant Examiner—John W. Cabeca
Attorney, Agent, or Firm—Shlesinger Arkwright Garvey

[57] ABSTRACT

A robot device is provided, particularly for scaling vertical surfaces, comprising a frame structure 1 having four sides 2 to 5, preferably in a rectangular configuration, adjacent ends of each of the sides 2 to 5 being pivotally coupled together by pivots 6. Each of the side members 2 to 5 is provided with suction devices 7 associated with the pivots 6 thereof and a linear actuator 9 is provided between two adjacent sides which is sequentially controlled by a microprocessor to sequentially change the configuration of the frame structure 1 to effect travelling movement of the robot device.

20 Claims, 4 Drawing Sheets

FOUR SIDED SCALING ROBOT

This invention relates to robot devices and is especially applicable to robot devices for scaling non-horizontal surfaces and particularly vertical or near vertical surfaces.

There is a requirement for a simple, low-cost wall scaling device which can carry inspection or surface preparation equipment up smooth or regular contoured vertical or near vertical surfaces. Typical applications are in the inspection, painting or cleaning of ships hulls, chemical storage tanks, corrugated iron industrial buildings, etc.

It is an object of the present invention to provide a suitable robot device which can be realised in a simple and low-cost form.

According to the present invention there is provided a robot device comprising a four sided frame structure, adjacent ends of each of the sides of which are pivotally coupled together, actuator means coupled between two of said sides for controlling the configuration of said frame structure, and processor means for causing said actuator means to be sequentially operated to effect travelling movement of said robot device.

In a preferred arrangement according to the invention, it will be arranged that said frame structure is of rectangular form and sequential operation of said actuator means is effective for causing said frame structure to alternate between opposite parallelogram configurations.

In carrying out said preferred arrangement, said robot device may comprise means associated with each of said sides for fixing the position thereof whereby when one of said sides is fixed, operation of said actuator means causes the opposed parallel side to be moved relative to said fixed side.

In an especially preferred arrangement, said means for fixing comprise at least one suction device associated with each of said sides, said suction devices being selectively operated by said processor means for fixing the position of the associated side, and preferably at least two suction devices associated with each of said sides will be provided, said suction devices being disposed at the pivotal couplings between each said side and the adjacent sides.

Advantageously, one or more further suction devices may be provided associated with each of said sides.

It may be arranged that said actuator means comprises a linear actuator, said linear actuator conveniently being coupled between positions on two adjacent sides of said frame structure, said positions being intermediate the pivotal couplings of each of said adjacent sides.

Preferably, said linear actuator will be a double-acting linear actuator which is operated pneumatically, and may further comprise position sensing means for sensing the position thereof.

Alternatively, it may be arranged that said actuator means comprises a rotary actuator, said rotary actuator being coupled between two adjacent sides of said frame structure at the pivotal coupling therebetween.

The robot device may comprise angle detector means connected to said processor means and associated with the sides of said frame structure for detecting the configuration of said frame structure.

It may be arranged that each of said suction devices comprises a flexible suction cup, and means for evacuating the air from said suction cup, said means for evacuating air conveniently comprising a pneumatically operated ejector pump.

Vacuum sensing means may also be provided connected to said processor means for sensing the vacuum in said suction cup.

Advantageously, each suction device will comprise a friction surface within said suction cup which, when said suction cup is evacuated, is caused to contact a supporting surface to which the suction cup is being attached.

Also, linear actuator means may be provided associated with each said suction device for extending the reach thereof.

A robot device in accordance with the present invention may comprise pneumatic control means operable under the control of said processor means for operating said actuator means and said suction devices, and computer means, typically in the form of a personal computer, serially connected to said processor means for controlling said travelling movement of said device.

An exemplary embodiment of the invention will now be described reference being made to the accompanying drawings, in which.

Figure 1:
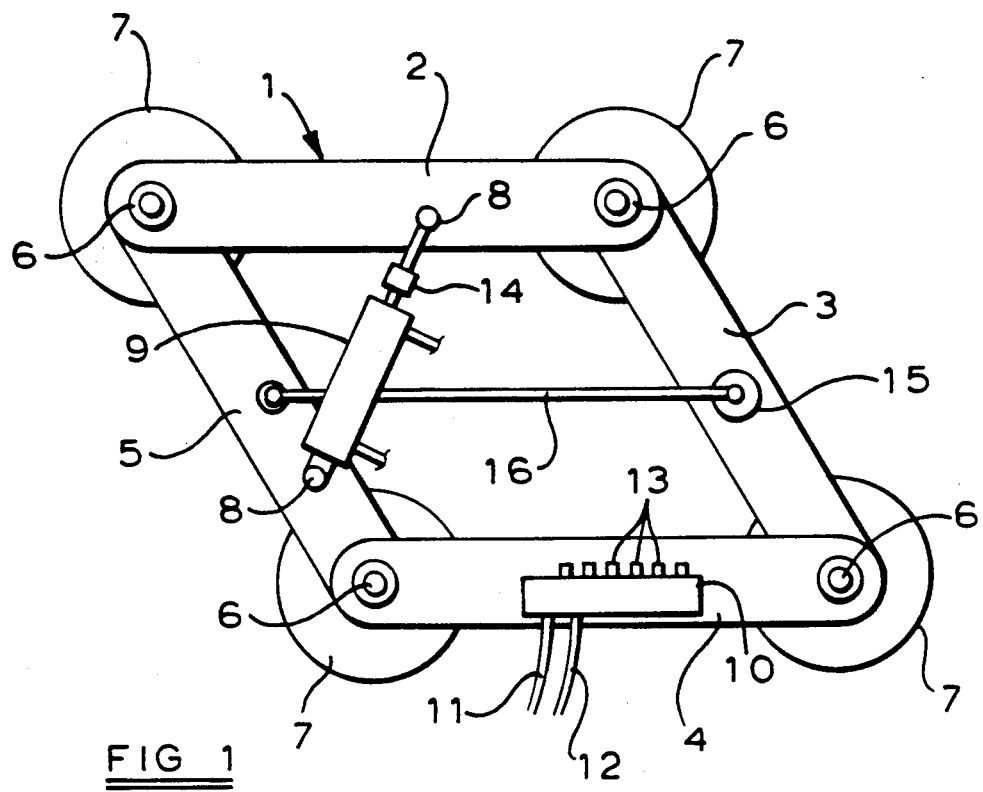
FIG. 1, is a plan view of a robot device in accordance with the present invention.

The robot device depicted in FIG. 1 comprises a frame structure 1, having four side members 2, 3, 4 and 5 arranged in a square/parallelogram configuration. The ends of the side members 2, 3, 4 and 5, which are adjacent to one another, are pivotally coupled together by means of pivots 6. Each of the pivots 6 is also provided with a pneumatically operated suction device 7 whereby the frame structure 1 can be attached to a supporting surface (not shown), which may, for example, be a vertical or near vertical wall.

Between the side members 2 and 5 of the frame structure 1, at points 8 intermediate their respective pivots 6, is coupled a pneumatically operated, double-acting linear actuator 9 which, when operated causes the configuration of the frame structure 1 to be changed, as will be described with reference to FIG. 3, in order to effect travelling, e.g. scaling, movement of the robot device.

Control of the robot device of FIG. 1 is effected by means of a microprocessor (not shown) contained within the control box 10 carried on the side member 4, the microprocessor typically being connected to a remote personal computer (not shown) as will be described with reference to FIG. 4, by means of a serial link 11. The control box 10 is also provided with a source of high pressure air via input pipe 12 and affords outputs 13, controlled by the microprocessor, for connection to the linear actuator 9 and the suction devices 7 as will hereinafter be explained.

For the purpose of controlling the operation of the robot device of FIG. 1, the linear actuator 9 is provided with a position sensor 14 for sensing its position, or alternatively with an angle sensor 15 connected to a link 16 coupled between the opposed side members 3 and 5, the position sensor 14 or the angle sensor 15 affording an output which is indicative of the particular configuration of the frame structure 1. The output from the position sensor 14 or angle sensor 15 is applied to the microprocessor of the control box 10 as will hereinafter be described.

Figure 2:
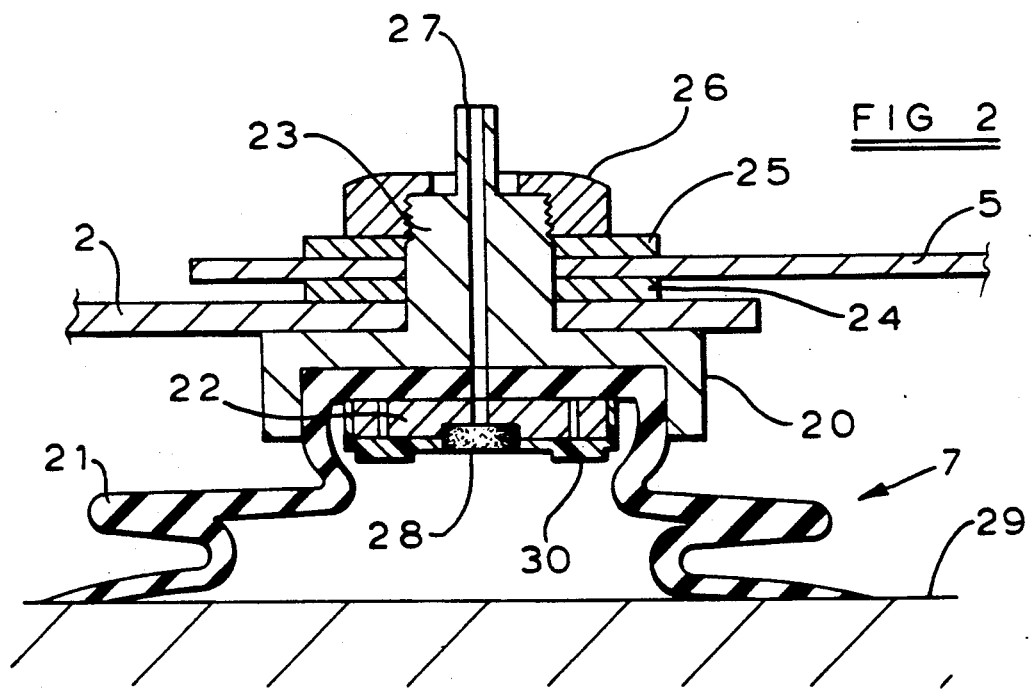
FIG. 2, is a cross-sectional side view of one of the suction devices of FIG. 1.

In FIG. 2 of the drawings, there is depicted a cross-sectional side view of one of the suction devices 7 of the robot device of FIG. 1. The suction device 7 of FIG. 2 comprises a central boss 20 which provides a housing for a flexible convoluted suction cup 21 which is secured to the boss 20 by means of a retaining plate 22 which is screwed to the boss 20. The boss 20 is also provided with an upwards extension 23 which forms the pivotal connection between, for example, the side members 2 and 5 of the frame structure of FIG. 1, through which the extension 23 extends, a bearing washer 24 being provided between the side members 2 and 5 and a further bearing washer 25 being provided between the side member 5 and a retaining nut 26 which is screwed to the top part of the extension 23.

The boss 20 is also provided with a central bore hole 27 which extends through the suction cup 21 and the retaining plate 22 and which enables the air within the suction cup 21 to be evacuated. In order to prevent dirt particles from being sucked up the bore hole 27, a filter 28 is provided in the vicinity of the retaining plate 22.

When the air in the suction cup 21 is evacuated, the boss 20 is pulled down firmly on to the supporting surface 29 until the retaining plate 22 contacts the surface 29, and the retaining plate 22 may, advantageously, be provided with a suitable high friction material 30 which can bear some of the load of the suction device 7.

Figure 3:
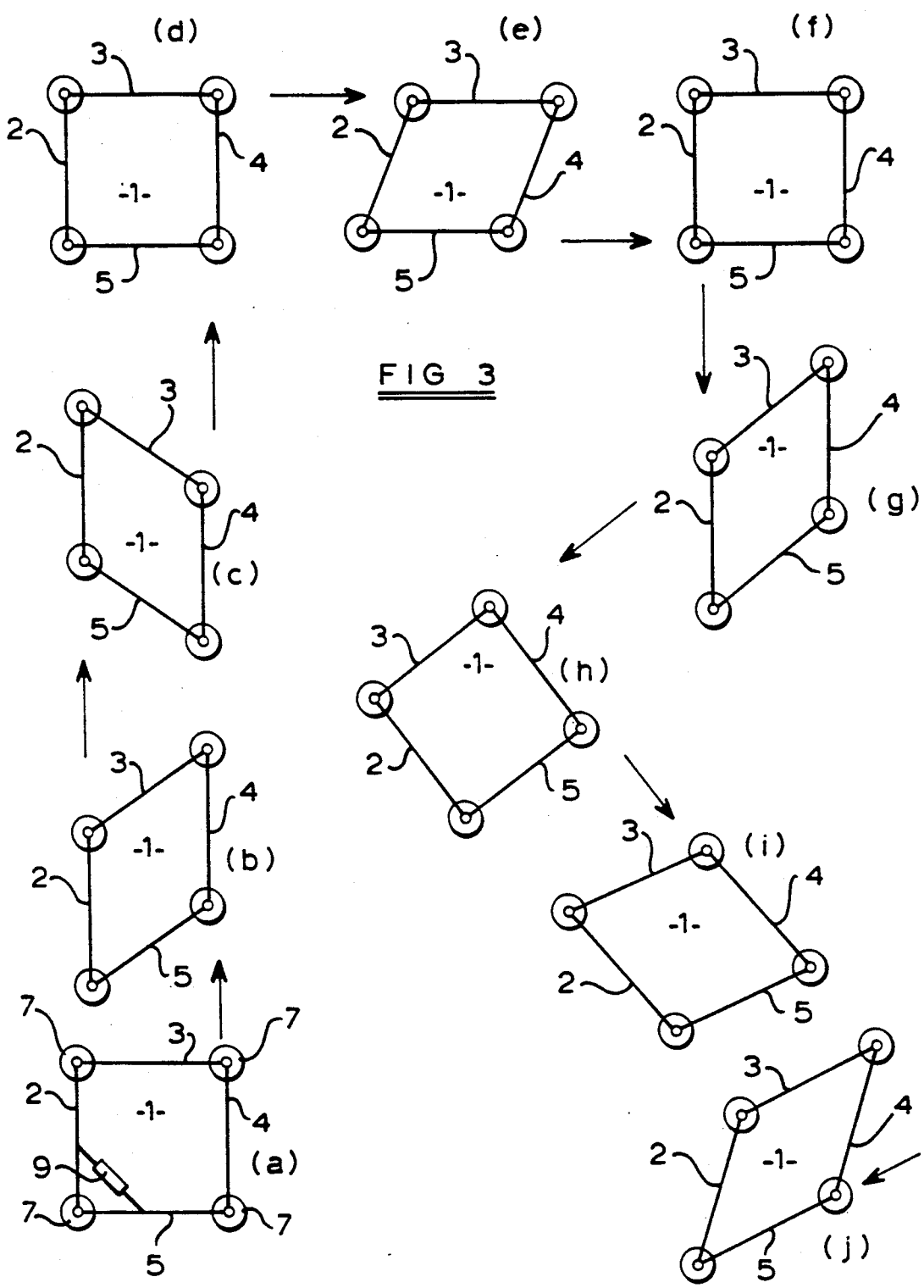
FIG. 3, depicts diagrammatically how travelling movement of the robot device of FIG. 1 is effected.

In FIG. 3 of the drawings there is depicted in diagrams (a) to (j) how travelling movement of the robot device of FIG. 1 is effected.

In diagram (a) of FIG. 3, the four side members 2 to 5 of the frame structure 1 of the robot device are depicted in a rectangular configuration, with the suction devices 7 provided at the pivotal couplings between adjacent ones of the side members 2 to 5. The linear actuator 9 is also shown coupled between the side members 2 and 5.

In order to cause the robot device to be moved vertically as shown in the drawing, the suction devices 7 of side member 2 are operated to secure the side member 2 to the supporting surface and the linear actuator 9 is operated to shorten its length thereby causing the frame structure 1 to assume a parallelogram configuration as depicted in diagram (b) of FIG. 3, the side member 4 having been effectively raised vertically relative to the fixed side member 2.

The suction devices 7 of side member 4 are then operated to secure the side member 4 to the supporting surface and the suction devices 7 on the side member 2 are released. The linear actuator 9 is operated to increase its length to cause the frame structure 1 to assume the reverse parallelogram configuration as depicted in diagram (c) of FIG. 3, the side member 2 having been effectively raised vertically relative to the fixed side member 4.

This process may be repeated to cause the frame structure 1 to be moved to any desired vertical position, such as that shown in diagram (d) of FIG. 3.

The same process is used to effect horizontal and transverse movement of the frame structure 1.

In diagram (d) of FIG. 3 side member 5 is fixed and the linear actuator 9 shortened to effectively move side member 3 horizontally to the right as depicted in diagram (e), and side member 5 is then fixed and the linear actuator 9 lengthened to effectively move the side member 5 horizontally to the right as depicted in diagram (f).

Movement downwards is effected in the same way by fixing side member 4 and shortening the linear actuator 9 to effectively move the side member 2 downwards as depicted in diagram (g).

Transverse movement is also effected in the same way by fixing side member 5 in diagram (g) and by lengthening the linear actuator 9 to effectively move the side member 3 transversely to the left as depicted in diagram (h).

Reverse transverse movement is effected by fixing side member 2 and lengthening the linear actuator 9 to effectively move the side member 4 transversely to the right as depicted in diagram (i).

Transverse movement to the left can then be effected by fixing side member 3 and shortening the linear actuator 9 to effectively move the side member 5 transversely to the left as depicted in diagram (j).

From the diagrams (a) to (j) of FIG. 3 it will be appreciated that the frame structure 1 of the robot device can be moved in any direction on the supporting surface by using the sequential procedure of fixing one of the side members 2 to 5 and operating the linear actuator 9 to move the opposed parallel side member, and by fixing another of the side members 2 to 5 and operating the linear actuator 9 to move the opposed parallel side member.

Figure 4:
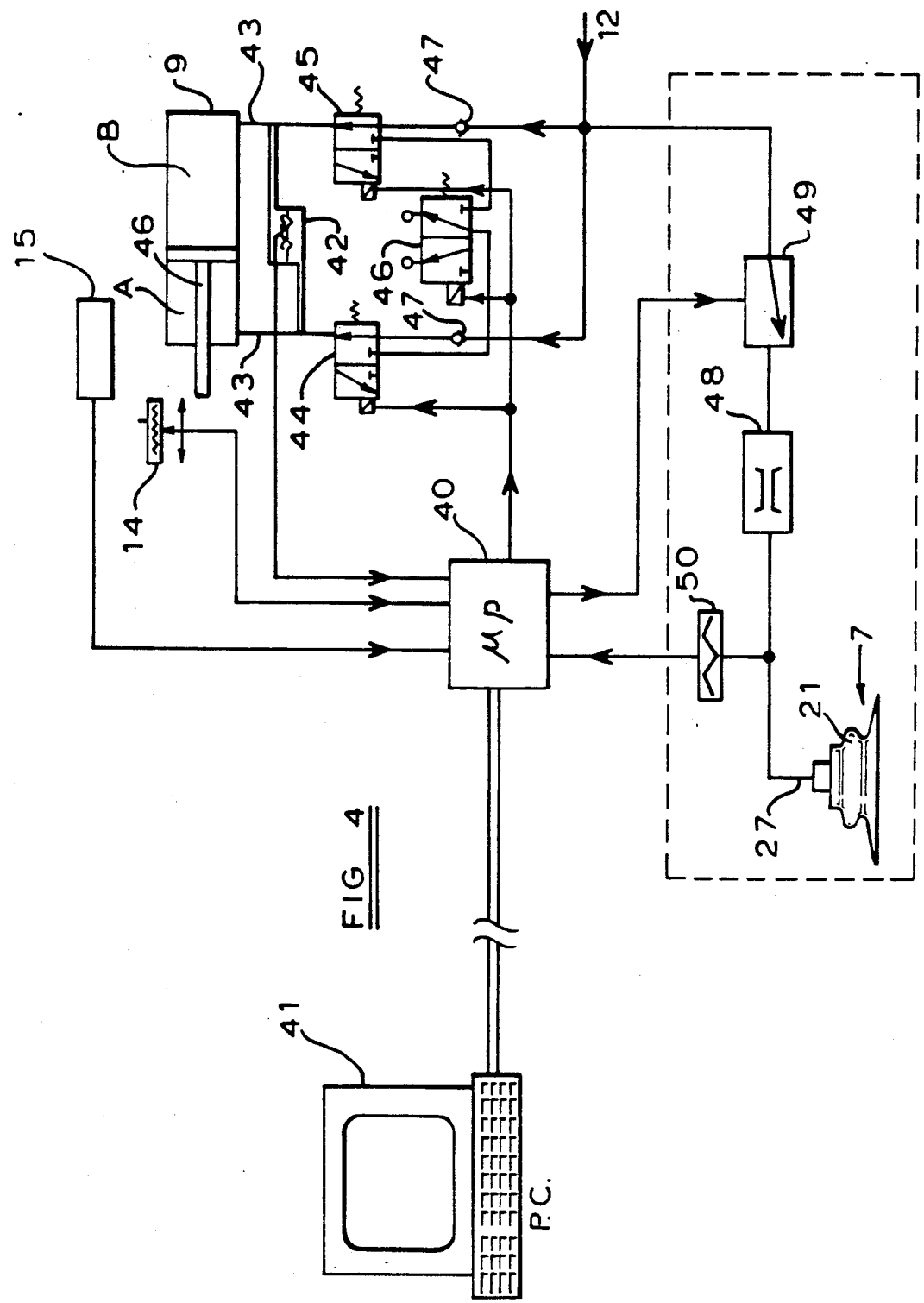
FIG. 4, is a block schematic diagram of the control system for the robot device of FIG. 1.

A control system for effecting the sequential control of the suction devices 7 and the linear actuator 9 of the robot device of FIG. 1 to effect travelling movement thereof is depicted in FIG. 4 of the drawings. The principle of operation of the control system of FIG. 4 is very similar to that described in U.K. Patent Application Publication No. 2230357A published 17th Oct., 1990 and corresponding European Patent Application Publication No. 0389243 published 26th Sept., 1990.

The control system shown in FIG. 4 which is contained in the main in the control box 10 of the robot device of FIG. 1, comprises a microprocessor 40 which is connected to a personal computer (PC) 41 via the serial link 11 already referred to in FIG. 1. The microprocessor 40 receives inputs from the position sensor 14 associated with the linear actuator 9 of FIG. 1, the angle sensor 15 of FIG. 1 and from a pressure sensor 42 which senses the differential pressure between the air inlets/outlets 43 of the linear actuator 9, and affords outputs to three electromatic pneumatic valves 44, 45 and 46 which control the flow of pressurised air from the supply pipe 12 referred to in FIG. 1 to the inlets/outlets 43 of the linear actuator 9. The electromatic valves, 44, 45 and 46 operate in the following way. Under normal conditions, the valves 44 and 45 allow pressurised air from the supply pipe 12 via check valves 47 to enter both sides A and B of the linear actuator 9 via the inlets/outlets 43 and assuming that the effects on the piston 46 of the linear actuator 9 are the same, the piston 46 remains stationary. Movement of the piston 46 of the linear actuator 9, which effectively increases or decreases its length, is effected by connecting either the valve 44 or the valve 45, under the control of the microprocessor 40, to the valve 46 which is connected as a diverter valve. The valve 46 is caused to be pulsed by the microprocessor 40 in order to allow a quantity of air to be exhausted from side A of the linear actuator 9 if it is to be lengthened or from side B of the linear actuator 9 if it is to be shortened, thereby causing the piston 46 to be moved to equalise the pressure differential between the inlets/outlets 43 of the linear actuator 9, the pressure differential being measured by the differential pressure sensor 42 and applied to the microprocessor 40. The change in position of the piston 46 of the linear actuator 9 is measured by the position sensor 14 and applied to the microprocessor 40 and the corresponding change in configuration of the frame structure 1 of FIG. 1 brought about by the lengthening or shortening of the linear actuator 9 is measured by the angle sensor 15 of FIG. 1, the output from which is fed to the microprocessor 40.

As well as controlling the operation of the linear actuator 9, the microprocessor 40 also controls the operation of each of the suction devices 7 of the robot device of FIG. 1, only one of which, for convenience, is shown in FIG. 4. It is to be understood, however, that the structure to be described in relation to the suction device 7 in FIG. 4, is provided for each of the suction devices 7 of the robot device of FIG. 1.

In order to effect evacuation of the air in the suction cup 21 of the suction device 7, it is connected to a vacuum ejector pump 48 of well known form, which is itself coupled to the pressurised air pipe 12 via an electromatic pneumatic valve 49 controlled by the microprocessor 40. When the suction device 7 is to be operated to cause it to attach itself to a supporting surface, the valve 49 is operated to apply pressurised air to the ejector pump 48 which evacuates the air in the suction cup 21. A pressure sensor 50 is provided for measuring the pressure in the suction cup 21 and to afford an indication to the microprocessor 40 of the quality of the vacuum formed in the suction cup 21 thereby enabling further movement to be halted until a secure grip has been obtained. It will be appreciated that automatic search routines and operator alarms may be included if desired.

The microprocessor 40 of FIG. 4 is operated in conjunction with the personal computer (PC) 41 to control the sequential operation of the linear actuator 9 and the suction devices 7 in order to effect travelling movement of the robot device of FIG. 1.

The basic arrangement of the robot device of FIG. 1 is given by way of example only and my be modified to suit any particular application whilst still retaining the inventive concept of the present invention.

Figure 5:
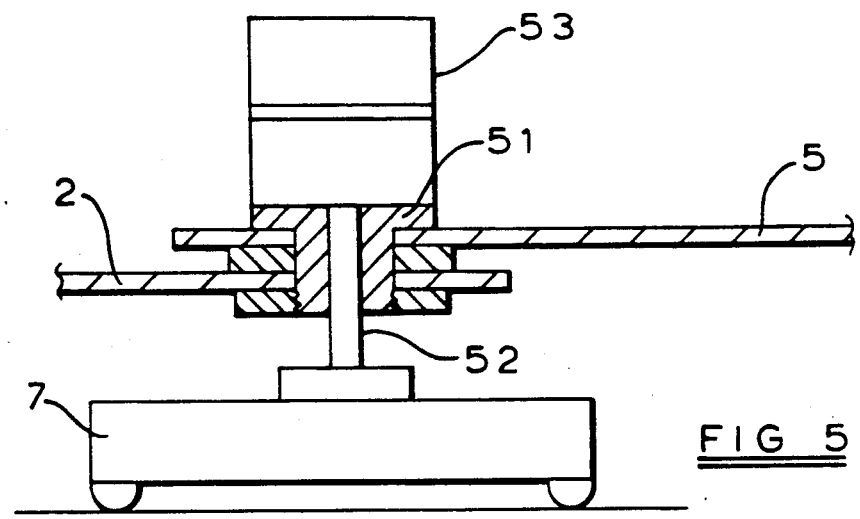
FIG. 5, is a cross-sectional side view of a modified form of suction device for use in the robot device of FIG. 1.

For example, in some applications, a high lift may be required in order that the robot device can lift itself over minor obstructions, etc. and one way of achieving this is to provide that each of the suction devices 7 of the robot device of FIG. 1 is provided with a lift actuator as shown in FIG. 5 of the drawings. In FIG. 5, a pneumatic lift actuator 53 is provided associated with the pivotal bearing 51 between the side members 2 and 5, for example, the lift actuator being provided with a piston shaft 52 on which is mounted the suction device 7 already referred to. The lift actuator 53 of each of the suction devices 7 may be operated under the control of the microprocessor 40 (FIG. 4), in the same way that the linear actuator 9 is operated.

Figure 6:
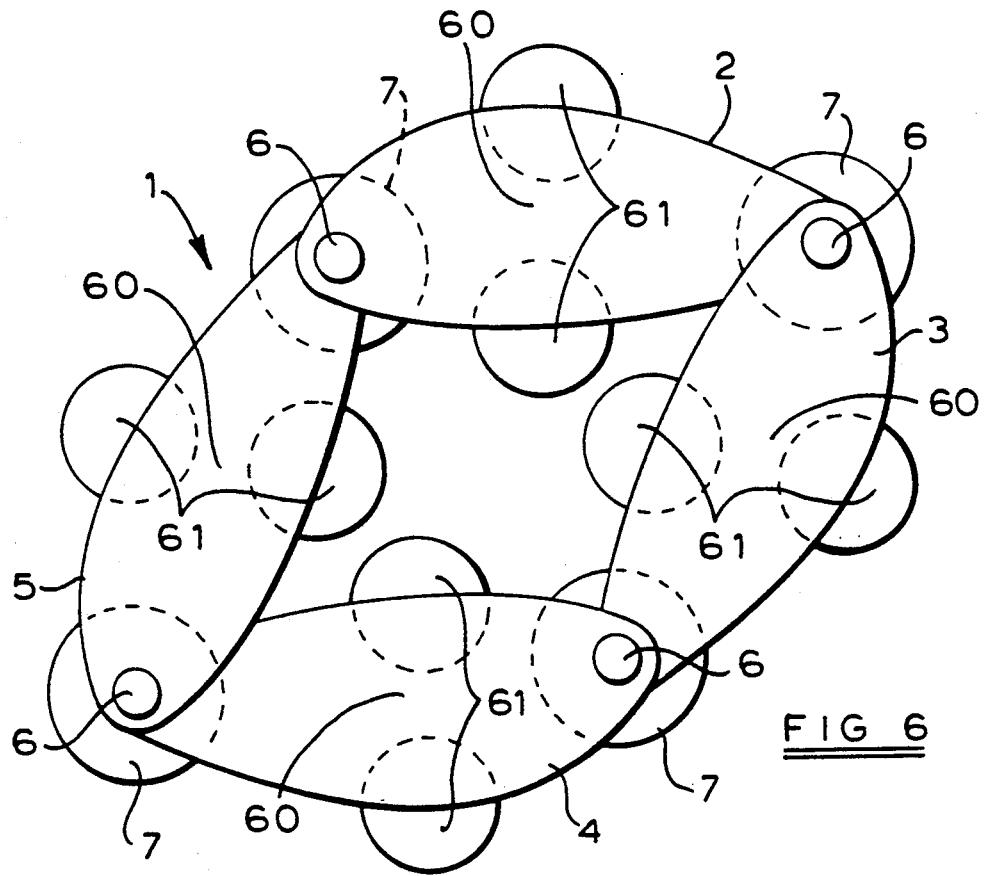
FIG. 6, is a plan view of a modified form of the robot device of FIG. 1.

In some applications the provision of the four suction devices 7 of the robot device of FIG. 1 may be insufficient either due to difficult terrain or due to the high payload the robot device is required to carry, in which case the number of suction devices 7 on each of the side members 2 to 5 of FIG. 1 may be increased. One suitable frame structure 1 for doing this is shown in FIG. 6 of the drawings. In this drawing, each of the side members 2 to 5 is provided with a widened mid-section 60 on the outside edges of which are provided two additional suction devices 61. Dependent upon the number of suction devices 61 provided on the side members 2 to 5, the suction devices 7 provided at the pivots 6 may be dispensed with.

As an alternative to using the suction device of FIG. 3, the robot device of FIG. 1 may use suction devices of the kind which form the basis of U.K. Patent Application No. 9017791.6 in which the ejector pump 48 of FIG. 4 is formed as an integral part of the suction device.

It is envisaged that other modifications may also be made. For example, the linear actuator 9 of the robot device of FIG. 1 may be replaced by a rotational actuator coupled, for example, between two adjacent sides of the frame structure 1 at the pivotal coupling 6 therebetween; the linear actuator 9 may be electrically or hydraulically operated; the vacuum ejector pump 48 (FIG. 4) may be replaced by a vacuum line.

The supply to the pneumatic system may use any suitable gas and may be fed to the robot device by pipe as described or provided in cylinder form on the robot device. In place of the serial link between the microprocessor 40 (FIG. 4) and the personal computer (PC) 41 (FIG. 4) a radio or other remote link may be provided whereby the robot device may be operated remotely.

Although the robot device which has been described is ideally suited for climbing purposes, it is envisaged that the robot device may be used on horizontal surfaces, e.g. floors, in which case the suction devices 7 may be replaced or supplemented with rubber or urethane blocks and simple lifting devices incorporating, for example, castors or rolling balls.

I claim:

1. A robot device comprising a four sided frame structure, adjacent ends of each of the sides of which are pivotally coupled together, actuator means coupled between two of said sides for controlling the configuration of said frame structure, means associated with each of said sides for fixing the position thereof, and processor means for causing said actuator means to be sequentially operated whereby when one of said sides is fixed, operation of said actuator means causes the opposed parallel side to be moved relative to said fixed side to effect travelling movement of the robot device.

2. The robot device as claimed in claim 1, in which said frame structure is of rectangular form and sequential operation of said actuator means is effective for causing said frame structure to alternate between opposite parallelogram configurations.

3. A robot device as claimed in claim 2, in which said means for fixing comprises at least one suction device associated with each of said sides, said suction devices being selectively operated by said processor means for fixing the position of the associated side.

4. A robot device as claimed in claim 3, comprising at least two suction devices associated with each of said sides, said suction devices being disposed at the pivotal couplings between each said side and the adjacent sides.

5. A robot device as claimed in claim 4, comprising one or more further suction devices associated with each of said sides.

6. A robot device as claimed in claim 5, in which said actuator means comprises a linear actuator.

7. A robot device as claimed in claim 6, in which said linear actuator is coupled between positions on two adjacent sides of said frame structure, said positions being intermediate the pivotal couplings of each of said adjacent sides.

8. A robot device as claimed in claim 6, in which said linear actuator is a double-acting linear actuator.

9. A robot device as claimed in claim 6, in which said linear actuator is pneumatically operated.

10. A robot device as claimed in claim 6, in which said linear actuator comprises position sensing means for sensing the position thereof.

11. A robot device as claimed in claim 5, in which said actuator means comprises a rotary actuator.

12. A robot device as claimed in claim 11, in which said rotary actuator is coupled between two adjacent sides of said frame structure at the pivotal coupling therebetween.

13. A robot device as claimed in claim 4, comprising angle detector means connected to said processor means and associated with the sides of said frame structure for detecting the configuration of said frame structure.

14. A robot device as claimed in claim 4, in which each of said suction devices comprises a flexible suction cup, and means for evacuating the air from said suction cup.

15. A robot device as claimed in claim 14, in which said means for evacuating air from said suction cup comprises an ejector pump.

16. A robot device as claimed in claim 15, in which said ejector pump is pneumatically operated.

17. A robot device as claimed in claim 14, comprising vacuum sensing means connected to said processor means for sensing the vacuum in said suction cup.

18. A robot device as claimed in claim 14, comprising a friction surface within said suction cup which, when said suction cup is evacuated, is caused to contact a supporting surface to which said suction device is being attached.

19. A robot device as claimed in claim 4, comprising a linear actuator associated with each said suction device, for extending the reach thereof.

20. A robot device as claimed in claim 4, comprising pneumatic control means operable under the control of said processor means for operating said actuator means and said suction devices, and computer means serially connected to said processor means for controlling said travelling movement of said robot device.

* * * * *

UNITED STATES PATENT AND TRADEMARK OFFICE
CERTIFICATE OF CORRECTION

PATENT NO. : 5,077,510
DATED : December 31, 1991
INVENTOR(S) : Arthur A. Collie It is certified that error appears in the above-identified patent and that said Letters Patent is hereby corrected as shown below:

Title page, item (73);

"Enteroprises" should read --Enterprise--.

Signed and Sealed this

Twenty-fourth Day of November, 1992

*Attest:*

DOUGLAS B. COMER

*Attesting Officer*     *Acting Commissioner of Patents and Trademarks*